(12) United States Patent
Lee et al.

(10) Patent No.: US 9,264,620 B2
(45) Date of Patent: Feb. 16, 2016

(54) IMAGE PHOTOGRAPHY APPARATUS AND METHOD FOR PROPOSING COMPOSITION BASED PERSON

(75) Inventors: Jong Ha Lee, Hwaseong-si (KR); Young Kyoo Hwang, Seoul (KR); Jung Bae Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 12/382,683

(22) Filed: Mar. 20, 2009

(65) Prior Publication Data

US 2010/0110266 A1 May 6, 2010

(30) Foreign Application Priority Data

Oct. 31, 2008 (KR) .................. 10-2008-0107835

(51) Int. Cl.
    *H04N 5/232* (2006.01)
(52) U.S. Cl.
    CPC ....... *H04N 5/23293* (2013.01); *H04N 5/23219* (2013.01)
(58) Field of Classification Search
    CPC ............ H04N 5/23219; H04N 5/2354; H04N 5/23293; H04N 2101/00; H04N 5/272
    USPC .............. 348/333.05, 333.02, 333.11
    See application file for complete search history.

(56) References Cited

U.S. PATENT DOCUMENTS

| 6,806,906 B1* | 10/2004 | Soga et al. ............... 348/333.03 |
| 7,349,020 B2* | 3/2008 | Stavely et al. ........... 348/333.02 |
| 7,924,340 B2* | 4/2011 | Kato ........................ 348/333.05 |
| 2003/0071908 A1* | 4/2003 | Sannoh et al. ................. 348/345 |
| 2004/0223063 A1* | 11/2004 | DeLuca et al. ................. 348/239 |
| 2006/0245007 A1* | 11/2006 | Izawa et al. .................... 358/448 |
| 2008/0024643 A1* | 1/2008 | Kato ........................ 348/333.01 |
| 2008/0025710 A1* | 1/2008 | Sugimoto ....................... 396/48 |

FOREIGN PATENT DOCUMENTS

| JP | 06-259554 | 9/1994 |
| JP | 06-337467 | 12/1994 |
| JP | 10-243274 | 9/1998 |
| JP | 2000-098456 | 4/2000 |
| JP | 2000-098484 | 4/2000 |
| JP | 2000-200354 | 7/2000 |
| JP | 2000-244800 | 9/2000 |
| JP | 2001-126070 | 5/2001 |
| JP | 2001-167253 | 6/2001 |
| JP | 2001-309225 | 11/2001 |
| JP | 2003-338955 | 11/2003 |
| JP | 2003-344891 | 12/2003 |
| JP | 2004-109247 | 4/2004 |

(Continued)

OTHER PUBLICATIONS

Korean Office Action dated Aug. 29, 2014 from Korean Patent Application No. 10-2008-0107835, 7 pages.

*Primary Examiner* — Twyler Haskins
*Assistant Examiner* — Carramah J Quiett
(74) *Attorney, Agent, or Firm* — NSIP Law (57) ABSTRACT

An image photographing method and apparatus for proposing a human composition. The image photographing apparatus may determine optimal composition information based on feature information that is detected from a photographed image and control a photographing parameter based on the determined optimal composition information.

20 Claims, 9 Drawing Sheets

(56) References Cited

FOREIGN PATENT DOCUMENTS

| | | |
|---|---|---|
| JP | 2004-128935 | 4/2004 |
| JP | 2004-222118 | 8/2004 |
| JP | 2005-099164 | 4/2005 |
| JP | 2005-167789 | 6/2005 |
| JP | 2006-025416 | 1/2006 |
| JP | 2006-100936 | 4/2006 |
| JP | 2007-027971 | 2/2007 |
| JP | 2007-088594 | 4/2007 |
| JP | 2007-158868 | 6/2007 |
| JP | 2007-174548 | 7/2007 |
| JP | 2007-215064 | 8/2007 |
| JP | 2007-228224 | 9/2007 |
| JP | 2007-258870 | 10/2007 |
| JP | 2008-015860 | 1/2008 |
| JP | 2008-035246 | 1/2008 |
| JP | 2008-092046 | 4/2008 |
| JP | 2008-160771 | 7/2008 |

* cited by examiner

IMAGE PHOTOGRAPHY APPARATUS AND METHOD FOR PROPOSING COMPOSITION BASED PERSON

CROSS-REFERENCE TO RELATED APPLICATIONS

This application claims the benefit of Korean Patent Application No. 10-2008-0107835, filed on Oct. 31, 2008, in the Korean Intellectual Property Office, the disclosure of which is incorporated herein by reference.

BACKGROUND

1. Field

Example embodiments relate to an image photographing apparatus and method for proposing a composition based on a human, that is, a human composition.

2. Description of the Related Art

A digital camera may convert a photosensitive signal of a subject to a digital image signal and store the digital image signal in a memory. The digital camera may compress an image signal photographed in a charge coupled device (CCD) and store the compressed image signal in the memory. Unlike a film camera, although a user is not a professional photographer, the user may readily photograph and edit an image using this digital camera. Also, the digital camera may store and maintain image data for a relatively long period of time. Therefore, the digital camera is being widely used among many users.

The user may verify a preview image of a subject via a liquid crystal display of the digital camera. Therefore, the user may readily obtain an image that is photographed at the user's desired composition. Currently, the digital camera may adopt various types of functions such as an automatic focusing function that may automatically calculate a distance from the subject when a shutter is pushed, to make it possible to obtain a clear image signal of the subject, a zoom function to make it possible to photograph the subject as if the subject is located at a near distance, or as if the subject is located at a far distance, and the like. Accordingly, a user convenience may be further improved.

When a user generally photographs a portrait, the user may think he or she has taken a really nice picture via a preview image. However, the user may be frequently disappointed to view the photograph that is printed out via a monitor or a printer. This may come from a difference between a composition of a stable and good-looking portrait and a real preview image.

SUMMARY

According to example embodiments, there may be provided an image photographing apparatus for proposing a human composition, the apparatus including: an obtainment unit to obtain an image having at least one frame; a decision unit to determine optimal composition information based on feature information that is detected from the image in association with a human region; and a control unit to control a photographing parameter based on the optimal composition information.

In this instance, the control unit may display guide information associated with the optimal composition information, and may control the photographing parameter according to a user input corresponding to the guide information.

Also, the feature information may include at least one of human information, face information, posture information, rotation information, eye location information, and edge information.

Also, the optimal composition information may include information associated with at least one of an exposure, a focus, a white balance, a zoom, a diaphragm, a burst shot, and a location movement.

Also, the decision unit may determine a shot type of the image based on the feature information, using an optimal composition database, and may determine the optimal composition information according to the shot type.

Also, the decision unit may extract divided lines in the image, and may determine the optimal composition information based on the feature information, so that the human region is disposed on the divided lines. Here, divided lines may indicate a composition guide lines that equally divide the image frame into three parts in both horizontal and vertical directions respectively.

Also, the decision unit may determine cutting of a body portion through a detection and segmentation of body portions in the human region, using the feature information, and may determine the optimal composition information from the decision result, using an optimal composition database. Here, cutting of the body portion may indicate that a body portion is undesirably cut from the image frame and thus becomes unseen.

Also, the decision unit may detect the size of a face region in the image using the feature information, and may determine the optimal composition information so that a background region is emphasized in the image according to the detected size.

Also, the decision unit may analyze at least one of a direction where a face of the human region faces towards, an eye direction, and a motion of the human region using the feature information, and may determine the optimal composition information based on the analysis result.

Also, the decision unit may extract divided lines in the image, may detect the size of a face region in the image using the feature information, and may determine the optimal composition information so that an eye region included in the face region is disposed on the divided lines according to the detected size.

Also, the decision unit may determine the optimal composition information so that the eye region of the face region may be focused on according to the detected human or the detected face size of the human, and so that an exposure value may be set to a predetermined numerical value.

Also, the decision unit may detect a number of humans included in the human region, using the feature information, and may determine the optimal composition information depending on whether the detected number of humans is greater than a predetermined threshold.

Also, the decision unit may detect information associated with at least one of a connecting object and a background line that are adjacent to the human region, using the feature information, and may determine the optimal composition information from location information associated with at least one of the connecting object and the background line. Here, a connecting object may indicate a long-shaped object that is extended from the human region or the face region, and a background line may indicate a salient edge in the background which crosses a neck portion of the human. These make the human appearance strange.

Also, the decision unit may determine at least one of first composition information, second composition information, third composition information, fourth composition information, and fifth composition information, using the feature information, and may determine the optimal composition information using the determined at least one information. Here, the first composition information may be determined based on a shot type of the image, the second composition information may be determined according to disposing of the human region on divided lines of the image, the third composition information may be determined according to determining cutting of a body portion in the human region, the fourth composition information may be determined based on at least one of a direction and a motion of the human region, and the fifth composition information may be determined according to disposing of an eye region of the image on the divided lines of the image.

According to example embodiments, there may be provided an image photographing method for proposing a human composition, the method including: obtaining an image having at least one frame; determining optimal composition information based on feature information that is detected from the image in association with a human region; and controlling a photographing parameter based on the optimal composition information.

According to example embodiments, there may be provided an image photographing apparatus and method for proposing a human composition that may determine optimal composition information using feature information that is extracted from an image and thereby may provide a beginner user with a basically desirable composition of a portrait.

Also, according to example embodiments, there may be provided an image photographing apparatus and method for proposing a human composition that may provide optimal composition information and a photographing parameter through analysis of a preview image and thereby allows a user to take a high quality of picture.

Also, according to example embodiments, there may be provided an image photographing apparatus and method for proposing a human composition that may automatically or manually control a photographing parameter according to at least one of an exposure, a focus, a white balance, a zoom, a diaphragm, a burst shot, and a location movement.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION OF EMBODIMENTS

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
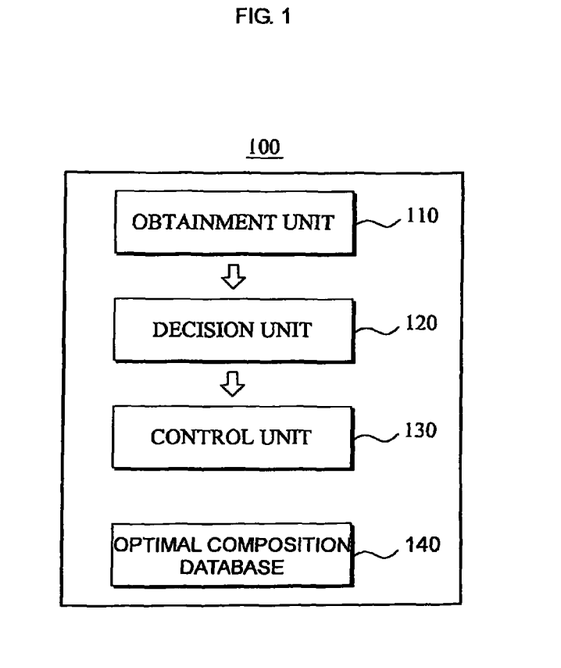
FIG. 1 is a block diagram illustrating an image photographing apparatus for proposing a human composition according to example embodiments.

FIG. 1 is a block diagram illustrating an image photographing apparatus 100 for proposing a human composition according to example embodiments.

The image photographing apparatus 100 for proposing the human composition (hereinafter, the image photographing apparatus 100) may obtain an image having at least one frame by photographing a subject. More specifically, the image photographing apparatus 100 may obtain a photographed signal from a photosensitive signal of the subject using a photographing device, for example, a charged coupled device (CCD). The image photographing apparatus 100 may convert the obtained photographed signal to the image that is a digital signal. The image may be a preview image having at least one frame. The image may be displayed via a display screen of the image photographing apparatus 100. Also, the subject may include at least one human.

When a user verifies the preview image and inputs a storage command via a shutter of the image photographing apparatus 100, the image photographing apparatus 100 may capture a picture from the image and store the captured picture in response to the storage command.

The image photographing apparatus 100 may provide the user with an optimal composition before the storage command is input. When the user is taking a picture in a bad composition, for example, when a body portion of a human is not included in a frame and thus is cut, when a connecting object is extended from the body portion, particularly, from a head portion or an ear of the human, or when a background line crosses a neck portion of the human, the image photographing apparatus 100 may provide the user with the optimal composition through analysis of the image.

In order to propose the optimal composition, the image photographing apparatus 100 may determine optimal composition information based on feature information that is detected from the image. The feature information may include at least one of human information, face information, posture information, rotation information, eye location information, and edge information associated with the human region. The optimal composition information may include at least one of an exposure, a white balance, a zoom, a diaphragm, a burst shot, and a location movement.

Specifically, the image photographing apparatus 100 may detect, from the image, feature information associated with the human region included in the image, using at least one algorithm. The image photographing apparatus 100 may determine optimal composition information for photographing the image at the optimal composition, based on the detected feature information. The optimal composition information may be at least one setting value about the exposure, the focus, the white balance, the zoom, the diaphragm, the burst shot, and the location movement. As shown in FIG. 1, the image photographing apparatus 100 may determine the optimal composition information using an optimal composition database 140 that is included in the image photographing apparatus 100. The optimal composition database 140 may include reference values that are used to determine the optimal composition information. For example, the optimal composition database 140 may include various reference images and optimal composition information that matches each of the various reference images.

The image photographing apparatus 100 may control a photographing parameter based on the determined optimal composition information. The photographing parameter may be control information for reflecting the optimal composition information in the image photographing apparatus 100. For example, when a particular exposure value is included in the optimal composition information, the image photographing apparatus 100 may control the photographing parameter of the image photographing apparatus 100, so that the particular exposure value may be applied to the image.

As shown in FIG. 1, the image photographing apparatus 100 may include an obtainment unit 110, a decision unit 120, and a control unit 130. The obtainment unit 110 may obtain an image having at least one frame. The decision unit 120 may determine optimal composition information based on feature information that is detected from the image in association with a human region. The control unit 130 may control a photographing parameter based on the optimal composition information.

Hereinafter, an operating method of the image photographing apparatus 100 will be further described in detail with reference to FIGS. 2 through 9.

Figure 2:
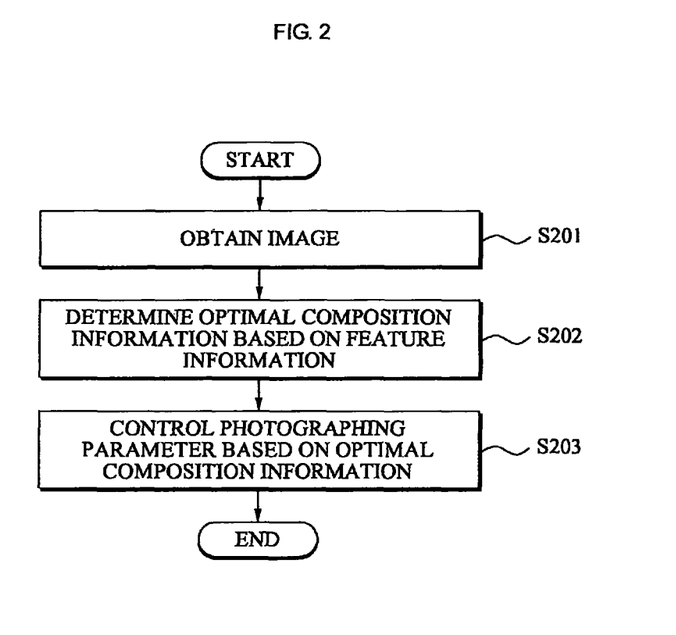
FIG. 2 is a flowchart illustrating an image photographing method for proposing a human composition according to example embodiments.

FIG. 2 is a flowchart illustrating an image photographing method for proposing a human composition according to example embodiments.

The image photographing method for proposing the human composition may be performed via operations S201 through S203. Operation S201 may be performed by the obtainment unit 110 of FIG. 1. Operation S202 may be performed by the decision unit 120. The operation S203 may be performed by the control unit 130.

In operation S201, the obtainment unit 110 may obtain an image having at least one frame. Specifically, the obtainment unit 110 may obtain a photographed signal from a photosensitive signal of a subject using a photographing device to convert the obtained photographed signal to the image that is a digital signal. The image may be a preview image having at least one frame. The subject may include at least one human.

Hereinafter, operation S201 will be further described in detail with reference to FIG. 3.

Figure 3:
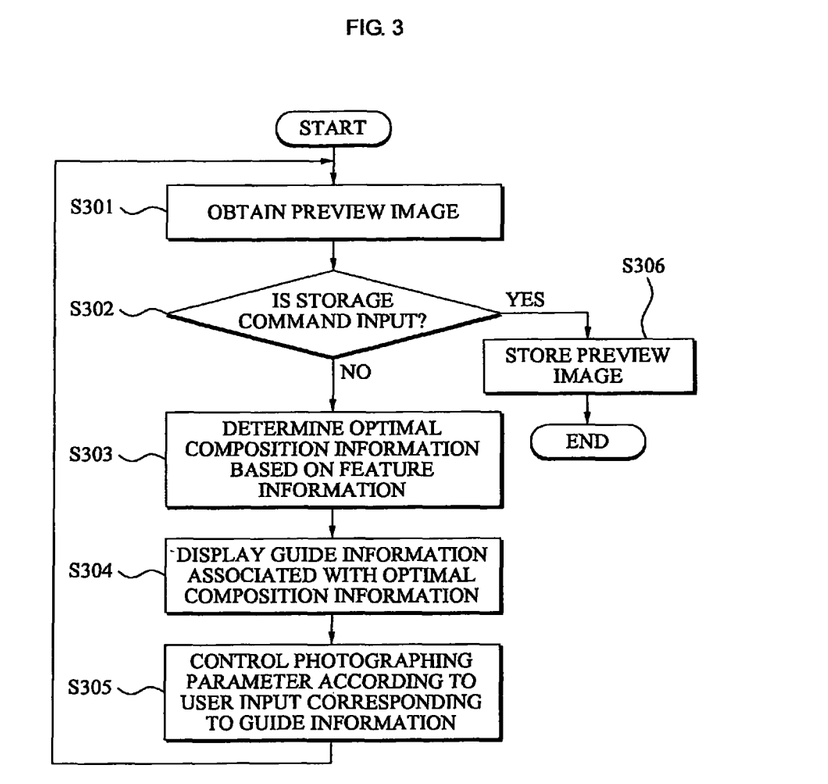
FIG. 3 is a flowchart illustrating an image photographing method for proposing a human composition according to other example embodiments.

FIG. 3 is a flowchart illustrating an image photographing method for proposing a human composition according to other example embodiments. As shown in FIG. 3, the image photographing method for proposing the human composition may be performed via operations S301 through S306. Operation S201 of FIG. 2 may be performed via operations S301, S302, and S306. Operation S301, S302, and S306 may be performed by the obtainment unit 110.

In operation S301, the obtainment unit 110 may obtain a preview image having at least one frame. The obtainment unit 110 may display the obtained preview image via a display screen.

When a storage command is input from a user within a predetermined period of time after the preview image is obtained in operation S302, the obtainment unit 110 may store the preview image in operation S306. The storage command may be, for example, to receive a user input via a shutter of the image photographing apparatus 100. Storing of the preview image may be to capture a picture from the image and to store the captured picture in response to the storage command. Conversely, when the storage command is not input from the user in operation S302, operation S303 may be performed.

According to example embodiments, when the storage command is input from the user in operation S302, the obtainment unit 110 may perform operation S306. When an optimal composition decision command is input from the user, the decision unit 120 may perform operation S303. When no command is input from the user, the preview image may be repeatedly displayed. For example, the optimal composition decision command may include a half-pressing of the shutter, an input of an optimal composition decision button, and the like.

In operations S202 and S303, the decision unit 120 may determine optimal composition information based on feature information that is detected from the image in association with a human region.

Specifically, the decision unit 120 may detect, from the image, feature information associated with the human region in the image and determine the optimal composition information based on the detected feature information.

The feature information may include at least one of human information, face information, posture information, rotation information, eye location information, and edge information. More specifically, the human information may include information associated with a location, a size, and a motion of the human region in the image. The face information may include information associated with a location and size of a face region of a human in the human region. The posture information may include associated with body portions such as a torso, a body, hands, and legs and the like in the human region. The eye location information may include information associated with an eye location in the face region. The rotation information may include information associated with a rotational direction of the human region and the face region, that is, a direction where a face towards. The edge information may include information associated with edge components around the human region and the face region.

The decision unit 120 may detect the human information, the face information, the posture information, the rotation information, the eye location information, and the edge information using at least one of a human detection, a motion detection, a face detection, an eye detection, a human body segmentation, and an edge detection.

For example, the decision unit 120 may detect the human information from the image using the human detection, for example, modeling of a histogram of a human appearance or a human image, and a classification learning algorithm such as a Support Vector Machine (SVM) or AdaBoost. When a motion occurs in the human region, the decision unit 120 may further detect information associated with the motion in the human region from a plurality of frame images, using the motion detection, for example, an optical flow and modeling of the motion. The decision unit 120 may detect the face information from the image using the face detection, for example, a Viola & Jones algorithm. The decision unit 120 may detect the posture information from the image using the human body segmentation, for example, a learning scheme and a probability modeling about a basic posture of the human body. The decision unit 120 may compare the human information and the face information with pre-stored human rotation pattern information and face rotation pattern information to thereby detect the rotation information from the image. The decision unit 120 may detect the eye location information from the image, using the eye detection, for example, the face information and a pattern recognition according to the classification learning algorithm such as the SVM or AdaBoost. The decision unit 120 may detect the edge information using the edge detection, for example, a Sobel operation scheme or a Canny edge detection scheme.

In order to detect the feature information, the decision unit 120 may select at least one of the human detection, the motion detection, the face detection, the eye detection, the human body segmentation, and the edge detection. Specifically, the decision unit 120 may detect the feature information by appropriately combining various types of detection schemes.

The decision unit 120 may determine the optimal composition information based on the detected feature information. The optimal composition information may include at least one of the exposure, the focus, the white balance, the zoom, the diaphragm, the burst shot, and the location movement. Hereinafter, example embodiments of determining the optimal composition information by the decision unit 120 will be described with reference to FIGS. 4 through 9.

According to example embodiments, the decision unit 120 may determine a shot type of the image from the feature information using an optimal composition database and determine the optimal composition information according to the shot type.

Figure 4A:
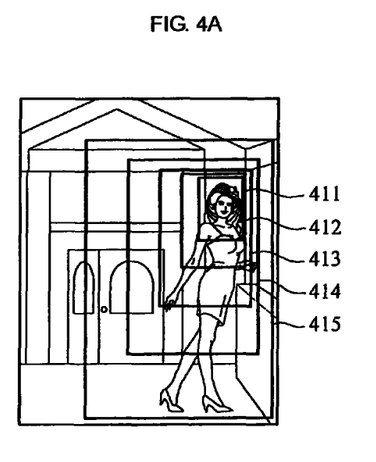
FIGS. 4A and 4B illustrate a shot type and a divided line in an image according to example embodiments.
Figure 4B:
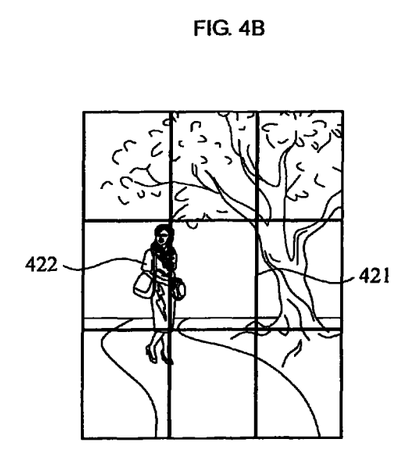

FIGS. 4A and 4B illustrate a shot type and a divided line in an image according to example embodiments. Hereinafter, an operation of the decision unit 120 will be further described in detail with reference to FIGS. 4A and 4B.

The shot type of the image may be classified into a close-up shot 411, a bust shot 412, a waist shot 413, a knee shot 414, a full shot 415, a long shot (not shown), and the like. As shown in FIG. 4, the close-up shot 411 may be an image based on a face. The bust shot 412 may be an image based on the upper half of the body. The waist shot 413 may be an image based on the upper half of the body over a waist. The knee shot 414 may be an image from a knee to a face. The full shot 415 may be an image generally including the human region. Although not shown in FIG. 4A, the long shot may be an image where the human region is relatively smaller than a background region.

As described above, the shot type may be classified based on a comparison between the human region and the background region. The decision unit 120 may classify the shot type of the image obtained by the obtainment unit 110 and determine optimal composition information according to the classified shot type. For example, when the shot type of the image is classified into the close-up shot 411, the decision unit 120 may determine the optimal composition information so that an exposure value may be changed to be focused on an eye region of the obtained image, or to more brightly photograph the face region. When the shot type is the knee shot 414, the decision unit 120 may determine the optimal composition information associated with a zoom and a location movement so that the size of an upper margin may be appropriately adjusted based on the human region. This is because when the upper margin is larger in the knee shot 414, it may give a view an unstable feeling. The decision unit 120 may determine the shot type of the image and determine the optimal composition information according to the determined shot type.

Also, the decision unit 120 may use the optimal composition database in order to determine the shot type. The optimal composition database may include various reference images and a shot type that matches each of the reference images. Specifically, the decision unit 120 may determine the shot type of the image by detecting the size and the location of the human region and the face region in the image using human information and face information and by comparing the detected size and the location of the human region and the face region with the reference images stored in the optimal composition database. Also, the decision unit 120 may determine the optimal composition information so that the image may be suitable for the determined shot type. For example, when the image is photographed at an intermediate composition of the knee shot and the full shot, the decision unit 120 may determine the shot type of the image as the knee shot according to an appropriate standard and may determine the optimal composition information so that the image may be based on the knee shot. In the case of the appropriate standard, the shot type may be determined as one that is closer between two shots, but the shot type may be determined so that the size of the human region may increase or may decrease. The optimal composition information may be information associated with a zoom and a location movement.

According to example embodiments, the decision unit 120 may extract divided lines in the image and determine the optimal composition information based on the feature information, so that the human region may be disposed on the divided lines. Hereinafter, an operation of the decision unit 120 will be further described in detail with reference to FIG. 4B.

As shown in FIG. 4B, the decision unit 120 may extract divided lines 421 in the image and detect a size and a location of a human region 422 in an image using feature information, for example, human information and face information. The decision unit 120 may determine the optimal composition information so that the detected human region 422 may be disposed on the divided lines 421. The optimal composition information may be zoom information and location movement information. Also, the decision unit 120 may determine the shot type of the image and determine the optimal composition information so that the human region 422 may be disposed on the divided lines 421. Also, the decision unit 120 may select a divided line most adjacent to the human region 422 and determine the optimal composition information so that the human region 422 may be disposed in the selected divided line. Here, the divided lines 421 may be, for example, three equally divided lines. According to example embodiments, the decision unit 120 may determine the optimal composition information so that the human region 422 may be disposed in an intersection of the divided lines 421 in the image.

As described above, when the human region 422 is positioned on the selected divided line or on the intersection of the divided lines 421 in the image, it is possible to take a picture at a stable composition. Using this, the decision unit 120 may determine the optimal composition information.

According to example embodiments, the decision unit 120 may determine cutting of a body portion through a segmentation and detection of body portions of the human region 422 using the feature information and determine the optimal composition information from the decision result using the optimal composition database.

Figure 5A:
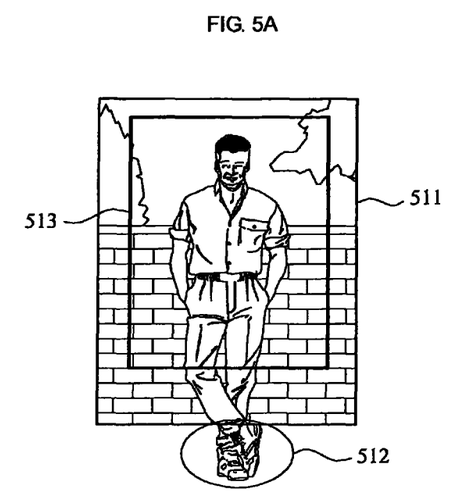
FIGS. 5A and 5B illustrate an image with cutting of a body portion and an image with an emphasized background according to example embodiments.
Figure 5B:
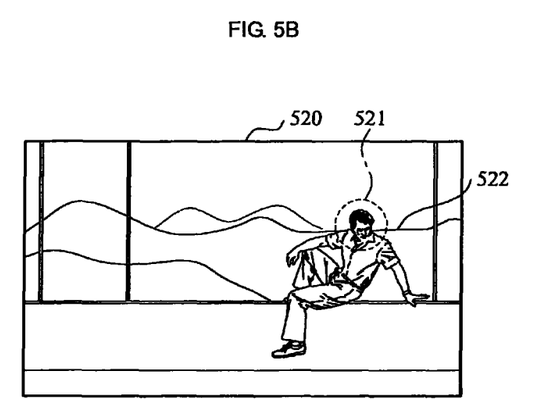

FIGS. 5A and 5B illustrate an image 511 with cutting of a body portion and an image 520 with an emphasized background according to example embodiments. Hereinafter, an operation of the decision unit 120 will be further described in detail with reference to FIGS. 5A and 5B.

As shown in FIG. 5A, the decision unit 120 may detect a size and a location of a human region in the image 511 using the feature information, for example, human information, face information, and posture information, and may detect each body portion such as an arm, a leg, a torso, a head and the like of the detected human region. The decision unit 120 may determine cutting of a body portion 512 based on the detected body portions. Also, the decision unit 120 may determine optimal composition information by determining how to process the cutting of the body portion 512 using an optimal composition database. For example, the decision unit 120 may determine a shot type of the image 511 through comparison between the human region in the image 511 and a plurality of reference images included in the optimal composition database. The decision unit 120 may determine the optimal composition information according to the determined shot type. For example, the decision unit 120 may determine the optimal composition information so that the image 511 may become a knee a shot 513. Here, the optimal composition information may be zoom information and location movement information.

According to example embodiments, the decision unit 120 may detect the size of a face region in the image 511 using the feature information and determine the optimal composition information so that a background region of the image 511 may be emphasized according to the detected size of the face region. Hereinafter, an operation of the decision unit 120 will be further described in detail with reference to FIG. 5B.

As shown in FIG. 5B, the decision unit 120 may detect a size and a location of a face region 521 in an image 520 using feature information, for example, human information and face information. When the size of the face region 521 is less than a predetermined relative value through a comparison with a background region, or when a shot type of the image 520 is determined as a long shot, the decision unit 120 may determine the optimal composition information so that the background region may be emphasized in the image 520. Here, the optimal composition information may be diaphragm information and the diaphragm information may include a fastening level in order not to lose the background region. According to example embodiments, the decision unit 120 may determine the optimal composition information to recommend a use of an optical lens for emphasis of the background region in the image 520.

Also, according to example embodiments, the decision unit 120 may extract divided lines in an image, detect a size of a face region in the image using feature information, and determine optimal composition information, so that an eye region of a face region may be disposed on the divided lines according to the detected size.

Figure 6A:
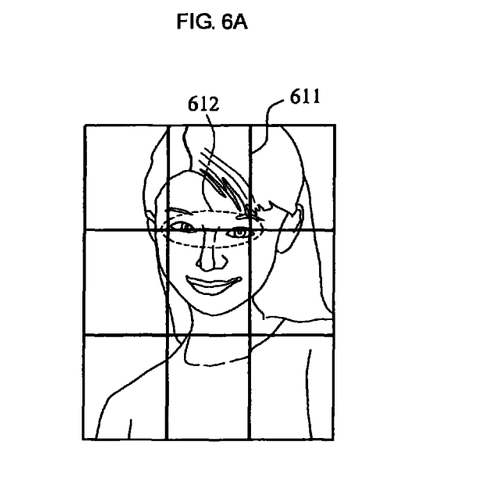
FIGS. 6A and 6B illustrate an image where an eye region matches divided lines and an image where a connecting object exists around a human region according to example embodiments.
Figure 6B:
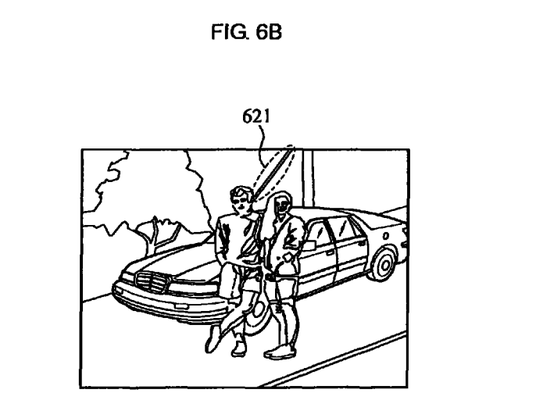

FIGS. 6A and 6B illustrate an image where an eye region matches divided lines and an image where a connecting object exists around a human region according to example embodiments. Hereinafter, an operation of the decision unit 120 will be further described in detail with reference to FIGS. 6A and 6B.

As shown in FIG. 6A, the decision unit 120 may extract divided lines 611 in the image and detect a size of a face region in the image, using feature information, for example, human information, face information, and eye location information. When the detected size of the face region is greater than a predetermined numerical value through a comparison between the detected size of the face region and a background region, or when a shot type of an obtained image is determined as a close-up shot, the decision unit 120 may determine optimal composition information so that an eye region 612 of the face region may be disposed on the divided lines 611. Here, the optimal composition information may be zoom information and location movement information. Also, the divided lines 611 may be three equally divided lines. Also, the decision unit 120 may detect a rotational direction of the face region using rotation information included in the feature information, and determine the optimal composition information so that the eye region 612 may be disposed in an upper divided line based on the rotation direction.

Also, according to example embodiments, the decision unit 120 may determine the optimal composition information so that the eye region 612 of the face region may be focused on according to the detected size, or so that the image may be photographed in a state where an exposure value is set to a predetermined numerical value.

Specifically, when the detected size of the face region is greater than or equal to the predetermined relative value through the comparison between the detected size of the face region with the background region, or when the shot type of the image is determined as any one of a close-up shot and a bust shot, the decision unit 120 may determine the optimal composition information so that the eye region 612 of the face region may be focused on and so that the exposure value may be set to the predetermined numerical value. Here, the optimal composition information may be focus information and exposure information. The focus information may include information to focus on an eye closer to a photographing device. The exposure information may include an over-exposure level for a bright facial expression.

Also, according to example embodiments, the decision unit 120 may detect information associated with at least one of a background line and a connecting object adjacent to the human region using the feature information, and may determine the optimal composition information from location information associated with at least one of the background line and the connecting body. Hereinafter, an operation of the decision unit 120 will be further described with reference to FIGS. 5A, 5B, 6A, and 6B.

As shown in FIGS. 5A, 5B, 6A, and 6B, the decision unit 120 may detect a human region and a face region using feature information, for example, human information, face information, and edge information, and may detect edge components 522 and 621. Here, the edge component 621 may be a connecting object that is extended from the human region and the face region, particularly, a head portion or an ear of the human. The edge component 522 may be a background line that crosses a neck portion of the human. The decision unit 120 may display a location of the detected edge component 522 or 621 on a preview for a user, or may determine the optimal composition information from location information associated with a corresponding edge component. The location information of the edge component may be included in the optimal composition information.

According to example embodiments, the decision unit 120 may detect a predetermined number of humans included in the human region, using feature information, and determine optimal composition information depending on whether the detected number of humans is greater than or equal to a predetermined threshold.

Specifically, the decision unit 120 may detect the number of humans included in the human region of the image, using feature information, for example, human information, face information, and eye location information. When the number of humans is greater than or equal to the threshold, the decision unit 120 may determine the optimal composition information to make a burst shot possible. In this instance, the decision unit 120 may detect a number of faces or a number of eyes included in the human region in order to detect the number of humans.

Also, according to example embodiments, the decision unit 120 may analyze at least one of a direction where a face of the human region faces towards, an eye direction, and a motion of the human region, and may determine optimal composition information based on the analysis result.

Figure 7:
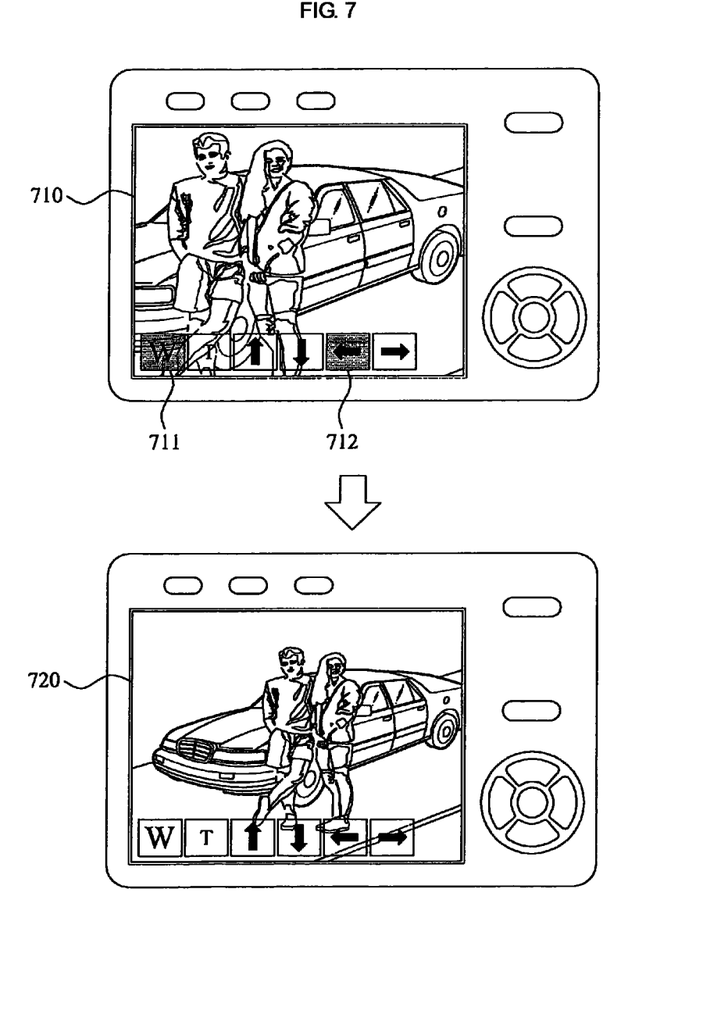
FIG. 7 illustrates an example of determining optimal composition information based on a direction and a motion of a human region according to example embodiments.

FIG. 7 illustrates an example of determining optimal composition information based on a direction and a motion of a human region according to example embodiments. Hereinafter, an operation of the decision unit 120 will be further described in detail with reference to FIG. 7.

As shown in an image 710 of FIG. 7, the decision unit 120 may analyze at least one of a direction where a face of a human region faces towards, an eye direction, and a motion of the human region, using feature information, for example, human information, face information, rotation information, and eye location information, and determine optimal composition information based on the analysis result. For example, the decision unit 120 may analyze at least one direction of the human region, a face region, an eye region, and a motion using the feature information. As shown in an image 720, the decision unit 120 may determine the optimal composition information so that the human region may be positioned in a divided line opposite to at least one of the above directions. Here, the optimal composition information may be zoom information and location movement information. When there is a direction difference among the human region, the face region, the eye region, and the motion, the decision unit 120 may determine the optimal composition information according to predetermined selection information or weight.

According to example embodiments, the decision unit 120 may determine at least one of first composition information, second composition information, third composition information, fourth composition information, and fifth composition information, using the feature information, and may determine the optimal composition information using the determined at least one information. Here, the first composition information may be determined based on a shot type of the image, the second composition information may be determined according to disposing of the human region in divided lines of the image, the third composition information may be determined according to determining cutting of a body portion in the human region, the fourth composition information may be determined based on at least one of a direction and a motion of the human region, and the fifth composition information may be determined according to disposing of an eye region of the image on the divided lines of the image.

Also, each of the first composition information, the second composition information, the third composition information, the fourth composition information, the fifth composition information, and the optimal composition information may include zoom information and location movement information.

More specifically, the decision unit 120 may determine the optimal composition information by collectively considering the aforementioned various example embodiments.

Figure 8:
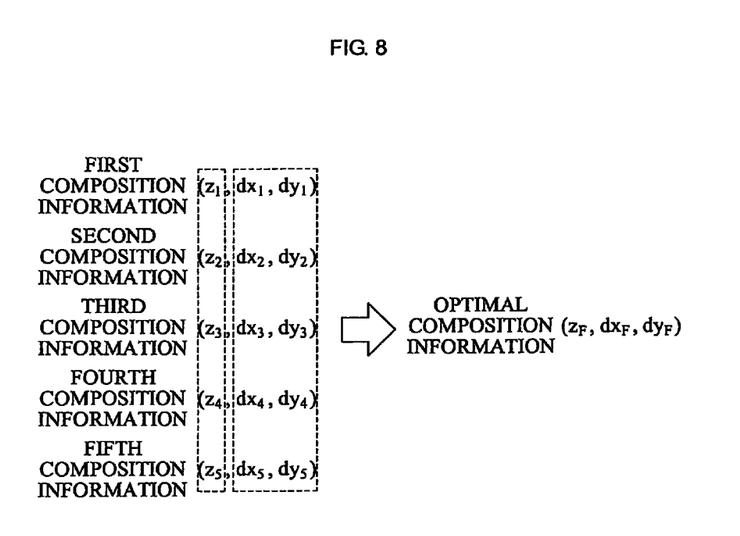
FIG. 8 illustrates an example of determining optimal composition information based on a plurality of composition information according to example embodiments.

FIG. 8 illustrates an example of determining optimal composition information based on a plurality of composition information according to example embodiments. Hereinafter, an operation of the decision unit 120 will be further described in detail with reference to FIG. 8.

As shown in FIG. 8, the decision unit 120 may determine a shot type of an image from feature information using an optimal composition database and determine first composition information according to the shot type. Here, the first composition information may include zoom information $z_1$ and location movement information $dx_1$ and $dy_1$.

Also, the decision unit 120 may extract divided lines in the image and determine second composition information using the feature information, so that a human region may be disposed in the dived lines. Here, the second composition information may include zoom information $z_2$ and location movement information $dx_2$ and $dy_2$.

Also, the decision unit 120 may determine cutting of a body portion through a segmentation and detection of body portions of the human region using the feature information and determine third composition information based on the decision result using the optimal composition database. Here, the third composition information may include zoom information $z_3$ and location movement information $dx_3$ and $dy_3$.

Also, the decision unit 120 may analyze at least one of a direction where a face of the human region faces towards, an eye direction, and a motion of the human region, using the feature information, and determine fourth composition information based on the analysis result. Here, the fourth composition information may include zoom information $z_4$ and location movement information $dx_4$ and $dy_4$.

Also, the decision unit 120 may detect a size of the face region in the image and determine fifth composition information so that an eye region of the face region may be disposed on the divided lines according to the detected size. Here, the fifth composition information may include zoom information $z_5$ and location movement information $dx_5$ and $dy_5$.

Also, the decision unit 120 may determine the optimal composition information using at least one of the first composition information, the second composition information, the third composition information, the fourth composition information, and the fifth composition information. Here, the optimal composition information may include zoom information $z_F$ and location movement information $dx_F$ and $dy_F$.

For example, when many of $z_1$, $z_2$, $z_3$, $z_4$, and $z_5$ are greater than 1, the decision unit 120 may determine the zoom information as zoom-in. Conversely, when many of $z_1$, $z_2$, $z_3$, $z_4$, and $z_5$ are less than 1, the decision unit 120 may determine the zoom information as zoom-out. In the case of the zoom-in, the decision unit 120 may determine, as $z_F$, a maximum value among values greater than 1. In the case of the zoom-out, the decision unit 120 may determine, as $z_F$, a minimum value among values less than 1. Also, the decision unit 120 may assign a weight to and add up $z_1$, $z_2$, $z_3$, $z_4$, and $z_5$ with the assigned weight, and then determine results of the addition as $z_F$. For example, as the weight, 4 may be assigned to $z_1$, 1 may be assigned to $z_2$, 2 may be assigned to $z_3$, 2 may be assigned to $z_4$, and 1 may be assigned to $z_5$.

Hereinafter, an example of determining $dx_F$ and $dy_F$ will be described. The decision unit 120 may determine a direction of a location movement depending on whether positive values are more or negative values are more among $dx_1$, $dx_2$, $dx_3$, $dx_4$, and $dx_5$. When the positive values are more, the decision unit 120 may determine an addition of weights with respect to the positive values as $dx_F$. Conversely, when the negative values are more, the decision unit 120 may determine an addition of weights with respect to the negative values as $dx_F$. For example, as the weight, 1 may be assigned to $dx_1$, 3 may be assigned to $dx_2$, 1 may be assigned to $dx_3$, 3 may be assigned to $dx_4$, and 2 may be assigned to $dx_5$. According to example embodiments, the decision unit 120 may determine, as $dx_F$, a maximum value, a minimum value, or an intermediate value instead of an addition of weights. Through the above scheme, the decision unit 120 may also determine $dy_F$.

Figure 9:
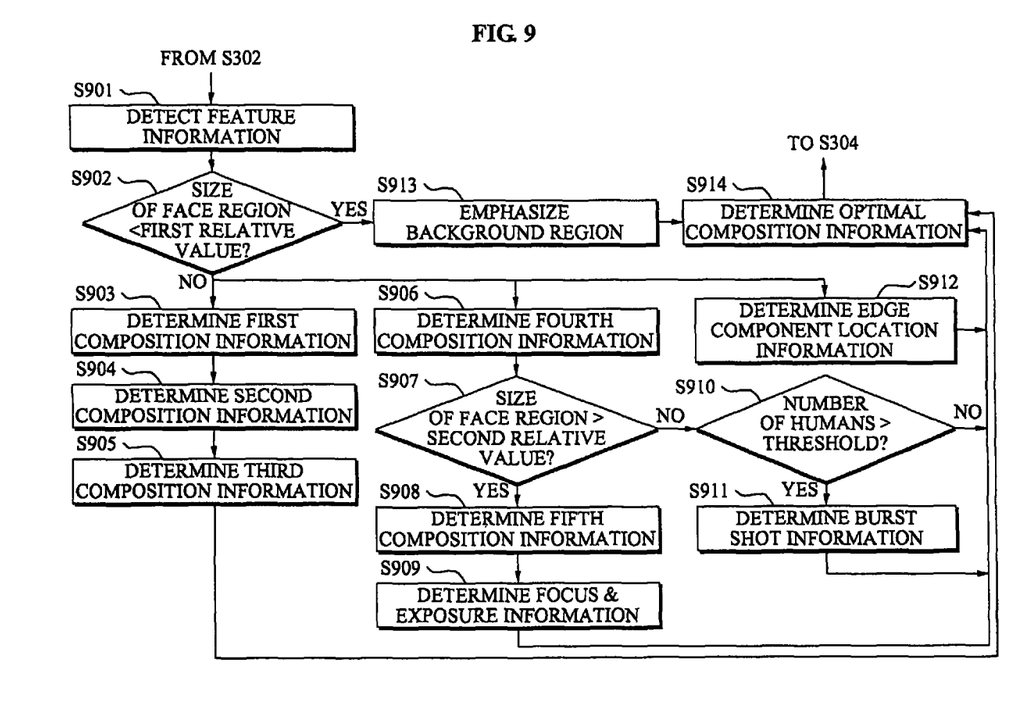
FIG. 9 is a flowchart illustrating a method of determining optimal composition information based on feature information according to example embodiments.

FIG. 9 is a flowchart illustrating a method of determining optimal composition information based on feature information according to example embodiments.

As shown in FIG. 9, the decision unit 120 may determine the optimal composition information based on the feature information via operations S901 through S914.

In operation S901, the decision unit 120 may detect feature information from a preview image. The feature information may include at least one of human information, face information, posture information, rotation information, eye location information, and edge information.

In operation S902, the decision unit 120 may compare the size of a face region with a background region in the image. When the size of the face region is less than a first relative value in operation S902, the decision unit 120 may determine diaphragm information to emphasize the background region in operation S913. In operation S914, the decision unit 120 may determine the diaphragm information as optimal composition information.

Conversely, when the size of the face region is greater than or equal to the first relative value in operation S902, the decision unit 120 may determine first composition information in operation S903, may determine second composition information in operation S904, may determine third composition information in operation S905, may determine fourth composition information in operation S906, and may determine edge component location information in operation S912.

In operation S907, the decision unit 120 may compare the size of the face region with the background region in the image and determine whether the size of the face region is greater than a second relative value. When the size of the face region is greater than the second relative value in operation S907, the decision unit 120 may determine fifth composition information in operation S908 and may determine focus information and exposure information in operation S909. In operation S914, the decision unit 120 may determine the optimal composition information based on the first composition information, the second composition information, the third composition information, the fourth composition information, the fifth composition information, the edge component location information, the focus information, and the exposure information.

Conversely, when the size of the face region is less than or equal to the second relative value in operation S907, the decision unit 120 may detect a number of humans included in the human region, using the feature information and determine whether the detected number of humans is greater than a predetermined threshold in operation S910. When the detected number of humans is greater than the threshold in operation S910, the decision unit 120 may determine burst shot information in operation S911. In operation S914, the decision unit 120 may determine the optimal composition information based on the first composition information, the second composition information, the third composition information, the fourth composition information, the edge component location information, and the burst shot information.

Conversely, when the detected number of humans is less than or equal to the threshold in operation S910, the decision unit 120 may determine the optimal composition information based on the first composition information, the second composition information, the third composition information, the fourth composition information, and the edge component location information in operation S914.

Referring again to FIG. 2, the control unit 130 may control a photographing parameter according to the optimal composition information in operation S203. Here, as described above, the optimal composition information may include information associated with at least one of an exposure, a focus, a white balance, a zoom, a diaphragm, a burst shot, and a location movement.

Specifically, the control unit 130 may control various photographing parameters of the image photographing apparatus 100 so that the determined optimal composition information may be reflected in actual photographing. For example, the control unit 130 may control a parameter for correcting a location of a lens included in the image photographing apparatus 100 in correspondence to the zoom information and the location movement information. Also, the control unit 130 may control a parameter for correcting a fastening of the diaphragm included in the image photographing apparatus 100 in correspondence to the diaphragm information. Also, the control unit 130 may control a parameter for correcting a shutter speed and a shutter sensitivity of the image photographing apparatus 100 in correspondence to the exposure information. When the determined optimal composition information is location information associated with an unnecessary edge component, the control unit 130 may control a screen display parameter so that the location information may be displayed on the display screen.

According to example embodiments, operation S203 may be performed via operations S304 and S305 of FIG. 3.

In operation S304, the control unit 130 may display guide information associated with the optimal composition information. In operation S305, the control unit 130 may control the photographing parameter according to a user input corresponding to the guide information. Specifically, the control unit 130 may display guide information associated with the optimal composition information and may control the photographing parameter according to the user input corresponding to the displayed guide information.

For example, as shown in FIG. 7, the decision unit 120 may determine optimal composition information of the image 710 as zoom information and location movement information based on feature information that is extracted from the image 710. The control unit 130 may display a zoom icon 711 and a location movement icon 712 on the display screen, as guide information associated with the optimal composition information. Also, the control unit 130 may control the photographing parameter according to the user input corresponding to the displayed guide information. The image 720 is an example of reflecting the controlled photographing parameter.

Also, according to example embodiments, instead of changing a photographing parameter according to a user input, when an image changes due to a direct movement of the user, the control unit 130 may recognize the image change and then suspend displaying of the zoom icon 711 and the location movement icon 712.

Also, according to example embodiments, as shown in FIG. 3, operation S301 may be repeatedly performed after operation S305 is performed. Specifically, operation S301 may be repeatedly performed with respected to a preview image in which the optimal composition information is reflected.

The image photographing method for proposing the human composition according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An image photographing apparatus for proposing a human composition, the apparatus comprising:
    an obtainment unit to obtain an image having at least one frame;
    a decision unit to determine optimal composition information based on feature information that is detected from the image in association with a detected human region, including a face region; and
    a control unit to control a photographing parameter based on the optimal composition information,
    wherein the decision unit determines a shot type of the image based on a result of a comparison between a size of the detected human region and a size of a detected background region, wherein the shot type indicating a type of a shot represented in the image,
    wherein the decision unit determines the optimal composition information based on the shot type,
    wherein the decision unit extracts divided lines in the image, and determines the optimal composition information so that one of the detected human region and an eye region included in the face region is disposed on at least one of the divided lines,
    wherein the decision unit determines at least one of zoom information and location movement information based on the determined shot type, and
    wherein the control unit controls the photographing parameter based on the at least one of zoom information and location movement information.

2. The apparatus of claim 1, wherein the control unit displays guide information associated with the optimal composition information, and controls the photographing parameter according to a user input corresponding to the guide information.

3. The apparatus of claim 1, wherein the image is a preview image.

4. The apparatus of claim 1, wherein the feature information comprises at least one of human information, face information, posture information, rotation information, eye location information, and edge information.

5. The apparatus of claim 1, wherein the optimal composition information comprises information associated with at least one of an exposure, a focus, a white balance, a zoom, a diaphragm, a burst shot, and a location movement.

6. The apparatus of claim 1, wherein the decision unit determines the shot type of the image based on the feature information, using an optimal composition database, and determines the optimal composition information according to the shot type.

7. The apparatus of claim 1, wherein the decision unit determines cutting of a body portion through a segmentation and detection of body portions in the human region, using the feature information, and determines the optimal composition information from the decision result, using an optimal composition database.

8. The apparatus of claim 1, wherein the decision unit detects the size of the face region in the image, within the human region, using the feature information, and determines the optimal composition information so that the background region is emphasized in the image according to the detected size.

9. The apparatus of claim 1, wherein the decision unit analyzes at least one of a direction and a motion of the human region using the feature information, and determines the optimal composition information based on the analysis result.

10. The apparatus of claim 9, wherein the decision unit detects information associated with the motion in the human region from a plurality of frame images.

11. The apparatus of claim 1, wherein the decision unit detects the size of the face region in the image, within the human region, using the feature information, and determines the optimal composition information so that the eye region is disposed on the divided lines according to the detected size.

12. The apparatus of claim 11, wherein the decision unit determines the optimal composition information so that the eye region of the face region is focused on according to the detected size and so that an exposure value is set to a predetermined numerical value.

13. The apparatus of claim 1, wherein the decision unit detects a number of humans included in the human region, using the feature information, and determines the optimal composition information depending on whether the detected number of humans is greater than a predetermined threshold.

14. The apparatus of claim 1, wherein the decision unit detects information associated with at least one of a connecting object and a background line that are adjacent to the human region, using the feature information, and determines the optimal composition information from location information associated with at least one of the connecting object and the background line.

15. The apparatus of claim 1, wherein:
    the decision unit determines at least one of first composition information, second composition information, third composition information, fourth composition information, and fifth composition information, using the feature information, and determines the optimal composition information using the determined at least one information, and
    the first composition information is determined based on the shot type of the image, the second composition information is determined according to disposing of the human region in the at least one of divided lines of the image, the third composition information is determined according to determining cutting of a body portion in the human region, the fourth composition information is determined based on at least one of a direction and a motion of the human region, and the fifth composition information is determined according to disposing of the eye region of the image on the at least one of divided lines of the image.

16. The apparatus of claim 15, wherein each of the first composition information, the second composition information, the third composition information, the fourth composition information, the fifth composition information, and the optimal composition information comprises zoom information and location movement information.

17. An image photographing method for proposing a human composition, the method comprising:
- obtaining an image having at least one frame;
- determining optimal composition information based on feature information that is detected from the image in association with a detected human region, including a face region; and
- controlling a photographing parameter based on the optimal composition information,
- wherein the determining comprises determining a shot type of the image based on a result of a comparison between a size of the detected human region and a size of a detected background region, and determining the optimal composition information based on the shot type,
- wherein the determining comprises extracting divided lines in the imam and determining the optimal composition information so that one of the detected human region and an eye region included in the face region is disposed on at least one of the divided lines,
- wherein the shot type indicating a type of a shot represented in the image,
- wherein the determining comprises determining at least one of zoom information and location movement information based on the determined shot type, and
- wherein the controlling comprises controlling the photographing parameter based on the at least one of zoom information and location movement information.

18. The method of claim 17, wherein the controlling comprises:
- displaying guide information associated with the optimal composition information; and
- controlling the photographing parameter according to a user input corresponding to the guide information.

19. The method of claim 17, further comprising:
- storing the image when a storage command is input from a user after the image is obtained,
- wherein, when the storage command is not input from the user for a predetermined period of time, the determining determines the optimal composition information based on the feature information.

20. A non-transitory computer-readable recording medium storing a program for implementing the method of claim 17.

* * * * *